(12) United States Patent
Kim et al.

(10) Patent No.: US 10,955,711 B2
(45) Date of Patent: Mar. 23, 2021

(54) LIQUID CRYSTAL DISPLAY DEVICE

(71) Applicant: Samsung Display Co., Ltd., Yongin-si (KR)

(72) Inventors: Dong In Kim, Yongin-si (KR); Jin Kyu Park, Yongin-si (KR); Yo Han Lee, Yongin-si (KR); Ki Hoon Choi, Yongin-si (KR); Hyun Seok Hong, Yongin-si (KR)

(73) Assignee: Samsung Display Co., Ltd.

( * ) Notice: Subject to any disclaimer, the term of this patent is extended or adjusted under 35 U.S.C. 154(b) by 0 days.

(21) Appl. No.: 15/655,480

(22) Filed: Jul. 20, 2017

(65) Prior Publication Data
US 2018/0039123 A1   Feb. 8, 2018

(30) Foreign Application Priority Data
Aug. 4, 2016   (KR) .................... 10-2016-0099595

(51) Int. Cl.
| | | |
|---|---|---|
| *G02F 1/1345* | (2006.01) | |
| *G06F 3/041* | (2006.01) | |
| *G02F 1/1362* | (2006.01) | |
| *G02F 1/1333* | (2006.01) | |
| *G06F 3/044* | (2006.01) | |

(52) U.S. Cl.
CPC ...... *G02F 1/13452* (2013.01); *G02F 1/13338* (2013.01); *G02F 1/13458* (2013.01); *G02F 1/136204* (2013.01); *G02F 2001/133388* (2013.01); *G02F 2201/503* (2013.01); *G06F 3/0412* (2013.01); *G06F 3/0443* (2019.05)

(58) Field of Classification Search
CPC ............ G02F 1/13458; G02F 1/13338; G02F 1/13452; G02F 1/136204; G02F 2201/503; G02F 2202/22; G02F 2001/133314; G02F 2001/133311; G06F 3/0412; G06F 3/044; G06F 3/04164; H01L 23/60; G02B 6/4275
See application file for complete search history.

(56) References Cited

U.S. PATENT DOCUMENTS

| | | | |
|---|---|---|---|
| 8,947,615 B2 | 2/2015 | Yu et al. | |
| 9,316,878 B2 | 4/2016 | Choi et al. | |
| 2005/0195338 A1* | 9/2005 | Matsumoto | G02F 1/136204 349/40 |
| 2010/0079692 A1* | 4/2010 | Hwang | G02F 1/1339 349/40 |
| 2010/0182524 A1* | 7/2010 | Nomura | G02F 1/133308 349/40 |

(Continued)

FOREIGN PATENT DOCUMENTS

| | | |
|---|---|---|
| JP | 2015-161753 A | 9/2015 |
| KR | 10-1577667 B1 | 12/2015 |

(Continued)

*Primary Examiner* — Angela K Davison
(74) *Attorney, Agent, or Firm* — Innovation Counsel LLP (57) ABSTRACT

Disclosed is a liquid crystal display device, including: a first substrate including a display area displaying an image, and a non-display area disposed in a form surrounding the display area; a second substrate spaced apart from the first substrate; and a liquid crystal layer disposed between the first substrate and the second substrate; and a first static electricity absorbing pattern disposed on the non-display area of the first substrate.

21 Claims, 7 Drawing Sheets

(56) References Cited

U.S. PATENT DOCUMENTS

| | | | |
|---|---|---|---|
| 2011/0128485 A1* | 6/2011 | Kim | G02F 1/1345 349/122 |
| 2012/0257151 A1* | 10/2012 | Teramoto | G02F 1/133512 349/106 |
| 2013/0027630 A1* | 1/2013 | Muraoka | G02F 1/13452 349/58 |
| 2014/0219646 A1* | 8/2014 | Hooton | G03B 15/03 396/176 |
| 2015/0177859 A1* | 6/2015 | Zhou | G06F 3/041 349/12 |
| 2015/0241745 A1 | 8/2015 | Tashiro | |
| 2017/0086296 A1 | 3/2017 | Lee et al. | |
| 2017/0108721 A1 | 4/2017 | Bae | |
| 2018/0107337 A1* | 4/2018 | Sun | G02B 1/16 |

FOREIGN PATENT DOCUMENTS

| | | |
|---|---|---|
| KR | 10-2017-0035379 A | 3/2017 |
| KR | 10-2017-0044803 A | 4/2017 |

\* cited by examiner

LIQUID CRYSTAL DISPLAY DEVICE

CROSS-REFERENCE TO RELATED APPLICATION

This application claims priority to and the benefit of Korean Patent Application No. 10-2016-0099595, filed on Aug. 4, 2016, in the Korean Intellectual Property Office, the entire contents of which are incorporated herein by reference in their entirety.

BACKGROUND

1. Field

The present disclosure relates to a liquid crystal display device.

2. Description of the Related Art

A liquid crystal display device is one of the flat panel display devices, which are currently and most widely used, and is a device in which an electric field is formed by applying different potentials to a pixel electrode and a common electrode of a liquid crystal display panel, so that an arrangement of the liquid crystal molecules is changed, thereby adjusting a light transmission rate and displaying an image.

The liquid crystal display panel itself of the liquid crystal display device is a non-emissive device, which does not emit light, so that the liquid crystal display device generally includes a backlight unit for providing light to the liquid crystal display panel at a rear surface of the liquid crystal display panel.

In general, the liquid crystal display device supports a backlight assembly by using a bottom chassis, seats the liquid crystal display panel on the backlight assembly, and then couples the liquid crystal display panel and the backlight assembly by using a top chassis. In this case, the top chassis surrounds a rim of the liquid crystal display panel.

Recently, a demand for a liquid crystal display device having a small thickness is increased, and a narrow bezel portion is considered excellent in a technical aspect and a design aspect.

SUMMARY OF THE INVENTION

The present disclosure has been made in an effort to solve the above-described problems associated with the prior art, and provides a liquid crystal display device, which is capable of effectively blocking static electricity flowing from the outside or generated inside thereof without introducing a separate structure or device.

An exemplary embodiment of the present disclosure provides a liquid crystal display device, including: a first substrate including a display area displaying an image, and a non-display area disposed in a form surrounding the display area; a second substrate spaced apart from the first substrate; and a liquid crystal layer disposed between the first substrate and the second substrate; and a first static electricity absorbing pattern disposed on the non-display area of the first substrate.

At least a part of the first static electricity absorbing pattern may not overlap the second substrate.

The first static electricity absorbing pattern may be disposed on one surface of the first substrate, the one surface of the first substrate facing the second substrate.

The liquid crystal display device may further include first pads disposed on the non-display area of the first substrate and connected to a first flexible printed circuit board through pad electrodes.

A part of the first static electricity absorbing pattern may be disposed between the first pads and a border area of the first substrate.

The first static electricity absorbing pattern may be connected with some of the pad electrodes and may be grounded.

A part of the first static electricity absorbing pattern may be disposed between the first pads.

The liquid crystal display device may further include a camera hole, which exposes a camera module to the outside.

The camera hole may be disposed in the non-display area.

A part of the first static electricity absorbing pattern may be disposed between the camera hole and a border area of the first substrate.

The second substrate may include a touch area, in which touch electrodes detecting a touch are disposed.

The liquid crystal display device may further include a second static electricity absorbing pattern disposed in an area other than the touch area.

The second static electricity absorbing pattern may be disposed in a form surrounding the touch area.

The second substrate may have one surface facing the first substrate, and another surface facing the one surface, and the second static electricity absorbing pattern may be disposed on the other surface.

The liquid crystal display device may further include a second pad which is disposed in an area other than the touch area, and is connected to a second flexible printed circuit board through pad electrodes.

At least a part of the second static electricity absorbing pattern may be disposed between the second pad and a border area of the second substrate.

The first substrate may have a larger area than an area of the second substrate.

Another exemplary embodiment of the present disclosure provides a display device, comprising: a substrate including a display area displaying an image and a non-display area disposed in a peripheral area surrounding the display area; a static electricity absorbing pattern disposed on the non-display area; a pad disposed inside the static electricity absorbing pattern and connected to a flexible printed circuit board; and wherein the flexible printed circuit board is bent inside the static electricity absorbing pattern and shielded by cover material outside.

Another exemplary embodiment of the present disclosure provides a liquid crystal display device, comprising: a first substrate including a display area displaying an image, and a non-display area disposed in a peripheral area surrounding the display area; a second substrate assembled with the first substrate; a liquid crystal layer disposed between the first substrate and the second substrate; a static electricity absorbing pattern disposed on the non-display area; and a pad disposed inside the static electricity absorbing pattern and connected to a flexible printed circuit board, wherein the flexible printed circuit board is bent inside the static electricity absorbing pattern and shielded by cover material outside.

According to the liquid crystal display device according to the exemplary embodiments of the present disclosure, the static electricity absorbing pattern disposed in the liquid crystal display panel is capable of absorbing static electricity flowing from the outside or generated inside of the liquid crystal display device, thereby effectively blocking electric influence on devices mounted inside the liquid crystal display device.

BRIEF DESCRIPTION OF THE DRAWINGS

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the example embodiments to those skilled in the art.

In the drawing figures, dimensions may be exaggerated for clarity of illustration. It will be understood that when an element is referred to as being "between" two elements, it can be the only element between the two elements, or one or more intervening elements may also be present. Like reference numerals refer to like elements throughout.

FIG. 2 is a cross-sectional view of the liquid crystal display device taken along line I-I' of FIG. 1a.

DETAILED DESCRIPTION OF THE INVENTION

The present disclosure may be variously modified and have various forms, so that specific exemplary embodiments will be illustrated in the drawings and described in detail in the text. However, it should be understood that the invention is not limited to the specific embodiments, but includes all changes, equivalents, or alternatives which are included in the spirit and technical scope of the present disclosure.

In the accompanying drawings, sizes of structures are illustrated to be enlarged compared to actual sizes for clarity of the present disclosure. Terms "first", "second", and the like may be used for describing various constituent elements, but the constituent elements should not be limited to the terms. The terms are used only to discriminate one constituent element from another constituent element. For example, a first element could be termed a second element, and similarly, a second element could be also termed a first element without departing from the scope of the present disclosure. As used herein, the singular forms are intended to include the plural forms as well, unless the context clearly indicates otherwise.

In the present disclosure, it should be understood that terms "include" or "have" indicates that a feature, a number, a step, an operation, a component, a part or the combination those of described in the specification is present, but do not exclude a possibility of presence or addition of one or more other features, numbers, steps, operations, components, parts or combinations, in advance. It will be understood that when an element such as a layer, film, region, or substrate is referred to as being "on" another element, it can be directly on the other element or intervening elements may also be present. Further, in the present disclosure, when a part of a layer, a film, an area, a plate, and the like is formed on another part, a direction, in which the part is formed, is not limited only to an up direction, and includes a lateral direction or a down direction. On the contrary, it will be understood that when an element such as a layer, film, region, or substrate is referred to as being "beneath" another element, it can be directly beneath the other element or intervening elements may also be present.

Hereinafter, an exemplary embodiment of the present disclosure will be described in detail with reference to the accompanying drawings. Aspects of the present disclosure are provided so that those skilled in the art may more completely understand the present disclosure. Exemplary embodiments suggested below may be modified into various forms, and it shall be understood that the scope of the present disclosure is not limited to the exemplary embodiments below, but include all of the changes, the equivalent matters, and substitutes included in the spirit and the technical range of the present disclosure.

Figure 1A:
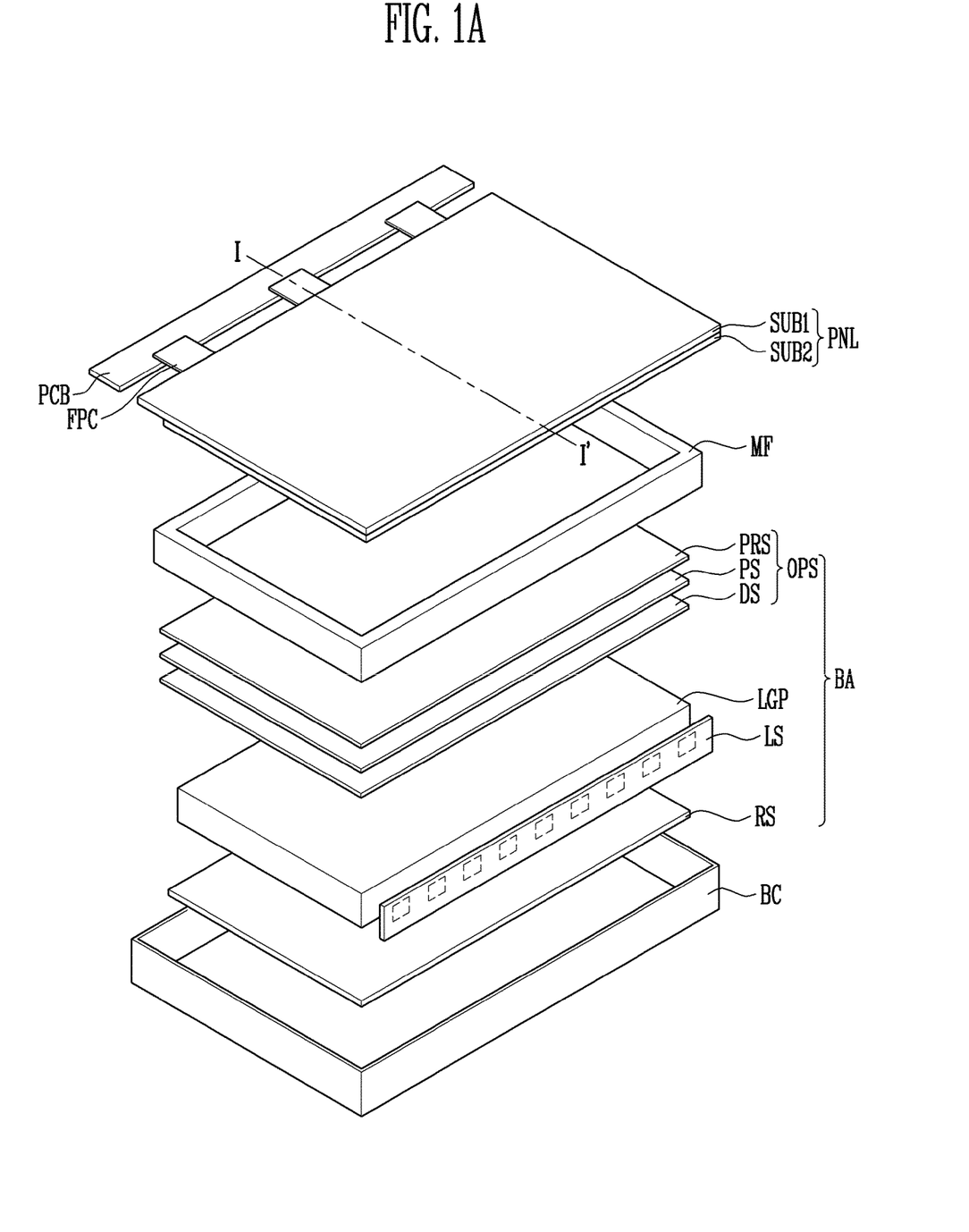
FIG. 1A is a schematic exploded perspective view illustrating a liquid crystal display device according to a first exemplary embodiment of the present disclosure.
Figure 1B:
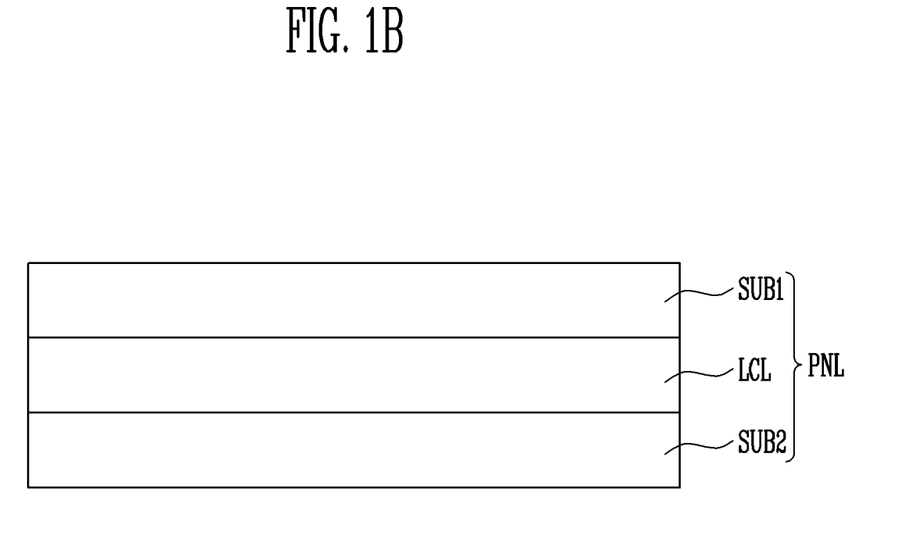
FIG. 1B is a schematic cross-sectional view of the liquid crystal display device illustrated in FIG. 1A.
Figure 2:
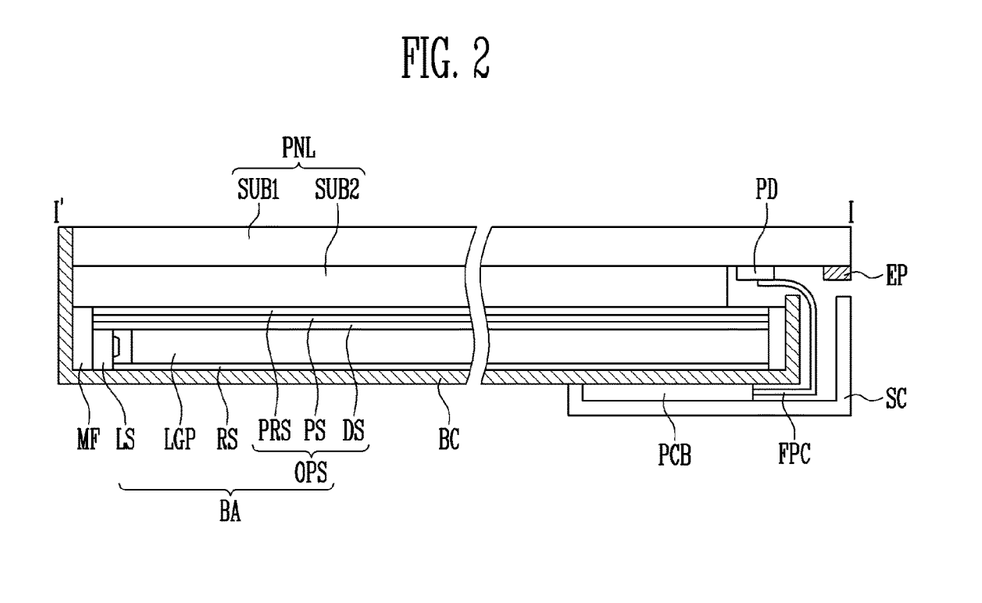

FIG. 1A is a schematic exploded perspective view illustrating a liquid crystal display device according to a first exemplary embodiment of the present disclosure, FIG. 1B is a schematic cross-sectional view of the liquid crystal display device illustrated in FIG. 1A, and FIG. 2 is a cross-sectional view of the liquid crystal display device taken along line I-I' of FIG. 1a.

FIG. 1B illustrates a liquid crystal layer LCL between a first substrate SUB1 and a second substrate SUB2, but in the remaining drawings to be described below, for convenience of the description of the present disclosure, the liquid crystal layer LCL between the first substrate SUB1 and the second substrate SUB2 is omitted.

Referring to FIGS. 1A, 1B, and 2, the liquid crystal display device according to the first exemplary embodiment of the present disclosure includes a bottom chassis BC, a backlight assembly BA, a liquid crystal display panel PNL, a mold frame MF, a printed circuit board PCB, and a shield cover SC.

The bottom chassis BC is formed in a rectangular box shape, of which an upper portion is opened, and may have an accommodating space having a predetermined depth therein. The bottom chassis BC has a bottom surface and a lateral wall extended from four borders of the bottom surfaces in an up direction, and the backlight assembly BA for providing light to a liquid crystal display panel PNL is accommodated in the accommodating space.

The backlight assembly BA may provide light to the liquid crystal display panel PNL, and may be disposed under the liquid crystal display panel PNL.

The backlight assembly BA includes a light source LS emitting light, a light guide plate LGP guiding light, optical sheets OPS disposed on the light guide plate LGP, a reflective sheet RS disposed under the light guide plate LGP, and the bottom chassis BC disposed under the reflective sheet RS.

Light emitted from the light source LS may be incident to a lateral surface of the light guide plate LGP and may be incident to an upper portion and a lower portion through the light guide plate LGP. Various light sources, such as a point line source, a line light source, or a surface light source, may be used as the light source LS, but the light source LS is not limited thereto. In FIGS. 1A and 2, it is exemplified that the light source LS is positioned at one side of the light guide plate LGP but is not limited thereto, and the light source LS may also be positioned at the other side facing the one side of the light guide plate LGP, and may also be positioned at all of the four corners of the light guide plate LGP. According to the exemplary embodiment, the light source may be formed in a direct type providing light at a lower side of the light guide plate.

The light guide plate LGP may guide the light incident from the light source LG in a direction of the liquid crystal display panel PNL. According to the exemplary embodiment, the light guide plate may be formed of a polymethyl methacrylate (PMMA) material having a high light transmission rate and a metastyrene (MS) material having excellent heat resistance and moisture tolerance.

The optical sheet OPS may be disposed between the light guide plate LGP and the liquid crystal display panel PNL. The optical sheet OPS may control the light incident from the light source, and may include a diffusion sheet DS, a prism sheet PS, and a protective sheet PRS laminated on the light guide plate LGP.

The reflective sheet RS may reflect light, which is not provided in the direction of the liquid crystal display panel PNL and leaks, and change a path of the light in the direction of the liquid crystal display panel PNL.

The liquid crystal display panel PNL includes the first substrate SUB1, and the second substrate SUB2 facing the first substrate SUB1.

The first substrate SUB1 may be disposed on the second substrate SUB2, and may include a thin film transistor and a pixel electrode. The thin film transistor and the pixel electrode may be formed on one surface of the first substrate SUB1 facing the second substrate SUB2.

The first substrate SUB1 may have a larger area than that of the second substrate SUB2, and one side of the first substrate SUB1 may not overlap the second substrate SUB2.

The second substrate SUB2 may include a common electrode formed of a transparent conductor, such as an indium tin oxide (ITO) and an indium zinc oxide (IZO). The common electrode may be formed on one surface of the second substrate SUB2 facing the first substrate SUB1. Further, the second substrate SUB2 may include a color filter.

According to the exemplary embodiment, the first substrate SUB1 may include at least one of a color filter and a common electrode, as well as the thin film transistor and the pixel electrode. In this case, the color filter and/or the common electrode may not be present in the second substrate SUB2.

The first substrate SUB1 and the second substrate SUB2 are bonded to each other with a predetermined interval, and the liquid crystal layer LCL is disposed between the first substrate SUB1 and the second substrate SUB2.

When an electric field is formed between the pixel electrode and the common electrode, an arrangement of the liquid crystal molecules included in the liquid crystal layer LCL is changed, and a light transmission rate is changed according to the changed arrangement to display an image.

The electric field may be formed in a vertical direction to the first substrate SUB1 and the second substrate SUB2. According to the exemplary embodiment, the electric field may be formed in a horizontal direction to the first substrate SUB1 and the second substrate SUB2.

The mold frame MF may be disposed along a border of the liquid crystal display panel PNL and support the liquid crystal display panel PNL under the liquid crystal display panel PNL. The mold frame MF may be disposed at positions corresponding to four sides of the liquid crystal display panel PNL, or at a position corresponding to at least a part of the four sides of the liquid crystal display panel PNL.

For example, the mold frame MF may have a quadrangular ring shape corresponding to the four sides of the liquid crystal display panel PNL, or may have a shape "⊏" corresponding to three sides in the borders of the liquid crystal display panel PNL. A single mold frame MF may be integrally formed, but a plurality of mold frames MF may be formed and assembled as necessary, instead. The mold frame MF may be formed of an organic material, such as a polymer resin. However, the mold frame MF is not limited thereto, and as long as the mold frame MF has the same shape and function, the mold frame MF may also be formed of other materials.

The flexible printed circuit board FPC may be attached to one side of the first substrate SUB1, and may include a driving circuit, such as a drive IC. Here, the one side of the first substrate SUB1 may mean a region of the first substrate SUB1 which does not overlap the second substrate SUB2.

The printed circuit board PCB may be connected to the first substrate SUB1 through the flexible printed circuit board FPC. According to the exemplary embodiment, the printed circuit board PCB may be connected to the first substrate SUB1 through a tape carrier package, and a driving circuit, such as a drive IC, may be mounted on the tape carrier package.

In FIG. 1A, the printed circuit board PCB is illustrated on the same plane as that of the liquid crystal display panel PNL for convenience of the description, but the printed circuit board PCB may be disposed under the bottom chassis BC as illustrated in FIG. 2. That is, one end of the flexible printed circuit board FPC is bonded to pads PD disposed at one side of the first substrate SUB1, and the other end thereof is connected to the printed circuit board PCB disposed under the bottom chassis BC.

The flexible printed circuit board FPC may be disposed to be bent so as to surround a side surface of the bottom chassis BC and a part of a lower surface of the bottom chassis BC.

In order for the flexible printed circuit board FPC, which is disposed to be bent, to protect the printed circuit board PCB from being damaged, the shield cover SC may be disposed so as to substantially surround the flexible printed circuit board FPC and the printed circuit board PCB.

The shield cover SC may have a horizontal portion, which is substantially parallel to the bottom surface of the bottom chassis BC, and a vertical portion, which is extended from one end of the horizontal portion in an up direction. The shield cover SC may be disposed so that the vertical portion thereof corresponds to a boundary of the liquid crystal display panel PNL. That is, the shield cover SC may be installed to be positioned inside a virtual vertically extended line of the border of the liquid crystal display panel PNL.

Further, a static electricity absorbing pattern EP absorbing static electricity may be disposed at one side of the first substrate SUB1. For example, static electricity may permeate to a space between the first substrate SUB1 and the shield cover SC from the outside, and may damage the thin film transistor disposed in the liquid crystal display panel PNL or cause a line defect and the like to the flexible printed circuit board FPC and the driving circuit mounted in the printed circuit board PCB.

Accordingly, the static electricity absorbing pattern EP may be disposed at one side of the first substrate SUB1 and absorb static electricity generated inside the liquid crystal display device or static electricity permeating to the space between the first substrate SUB1 and the shield cover SC to protect the thin film transistor and the like.

Further, the static electricity absorbing pattern EP may be connected to a ground electrode of the printed circuit board PCB through the pad PD, and may discharge the absorbed static electricity to the ground electrode.

FIGS. 3A, 3B, 3C, and 3D are top plan views of the first substrate according to the first exemplary embodiment of the present disclosure.

Referring to FIGS. 3A, 3B, 3C, and 3D, the first substrate SUB1 may have a display area DA and a non-display area NDA disposed in a peripheral area of the display area DA, where the peripheral area may be outside the display area DA.

The display area DA is an area in which an image is displayed, and the plurality of pixels PX may be disposed in the display area DA. The image may include predetermined visual information, for example, text, a video, a picture, and a 2D or 3D image.

The pixels PX may be disposed in plural and may be arranged in a matrix form. Herein, each pixel is illustrated in a rectangular shape, but is not limited thereto, and the pixel PX may be modified in various shapes. Further, the pixels PX may be disposed so as to have different areas. Further, the pixels PX may represent different colors, respectively.

Figure 3A:
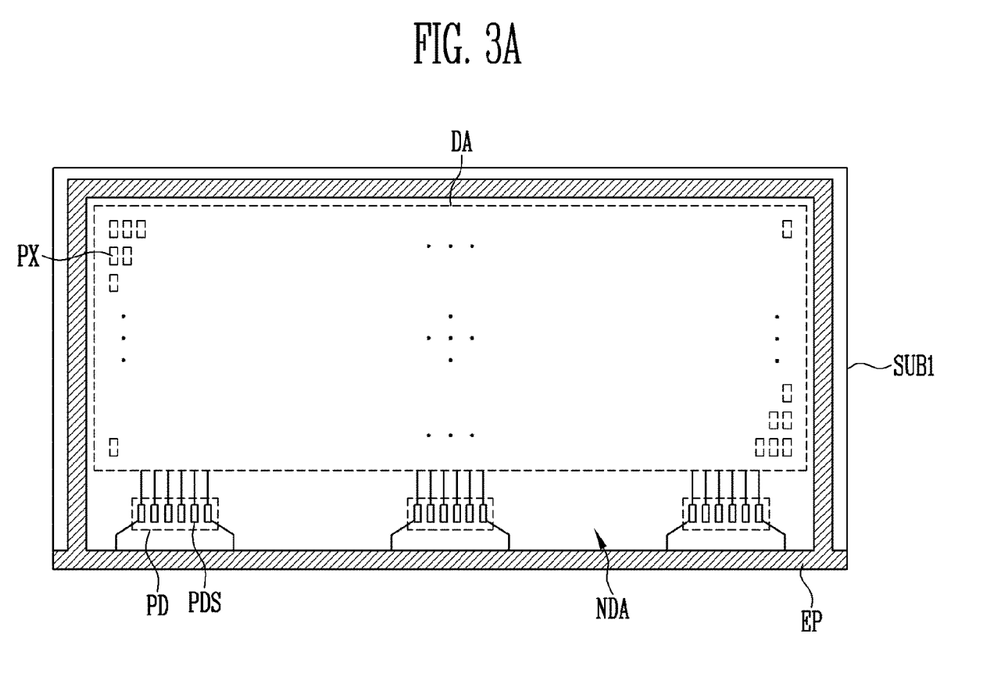
FIGS. 3A, 3B, 3C, and 3D are top plan views of a first substrate according to the first exemplary embodiment of the present disclosure.

The non-display area NDA may be formed in a circumference of the display area DA as illustrated in FIG. 3A, but is not limited thereto, and may be formed at only between one to three sides of the display area DA.

The non-display area NDA may include signal lines connected with the pixels PX, and the pads PD connecting the signal lines and the flexible printed circuit board FPC.

The pad PD may include pad electrodes PDS connected with the signal lines. The pad electrodes PDS may be connected to the signal lines of the flexible printed circuit board FPC, which is disposed on the pad PD while overlapping the pad PD. Further, some of the pad electrodes PDS may be connected to the ground electrode of the printed circuit board PCB through the flexible printed circuit board FPC and be grounded.

The non-display area NDA may include the static electricity absorbing pattern EP absorbing static electricity.

The static electricity absorbing pattern EP may be disposed in a form surrounding the display area DA, but is not limited thereto, and may be formed at only between one to three sides of the display area DA. Here, the static electricity absorbing pattern EP may be formed of the same material as those of at least some of the signal lines formed on the first substrate SUB1, and may block the static electricity from electrically influencing the pixels PX and the signal lines included inside the display area DA.

According to the exemplary embodiment, the static electricity absorbing pattern EP may be disposed in the border area of the first substrate SUB1 in a form surrounding the display area DA and the pads PD as illustrated in FIG. 3A. Particularly, since the static electricity absorbing pattern EP disposed between the pads PD and the border area of the first substrate SUB1 does not overlap the second substrate SUB2, the static electricity absorbing pattern EP may absorb static electricity flowing from the outside or generated inside the liquid crystal display device and block an electrical influence on the pad electrodes of the pad PD, the flexible printed circuit board FPC, and the elements mounted in the printed circuit board PCB.

Figure 3B:
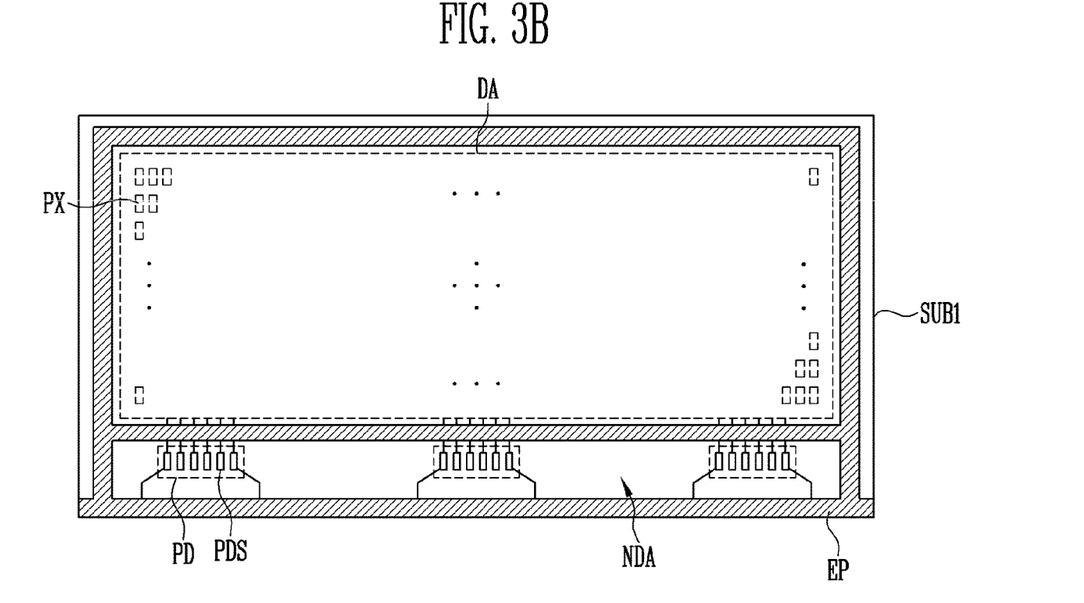

According to another exemplary embodiment, the static electricity absorbing pattern EP may be disposed between the display area DA and the pads PD, as well as the border area of the first substrate SUB1, as illustrated in FIG. 3B. The static electricity absorbing pattern EP disposed between the display area DA and the pad PD may absorb static electricity flowing from the outside or generated inside the liquid crystal display device and block an electrical influence on the pad electrodes of the pad PD, the flexible printed circuit board FPC, and the elements mounted in the printed circuit board PCB.

Figure 3C:
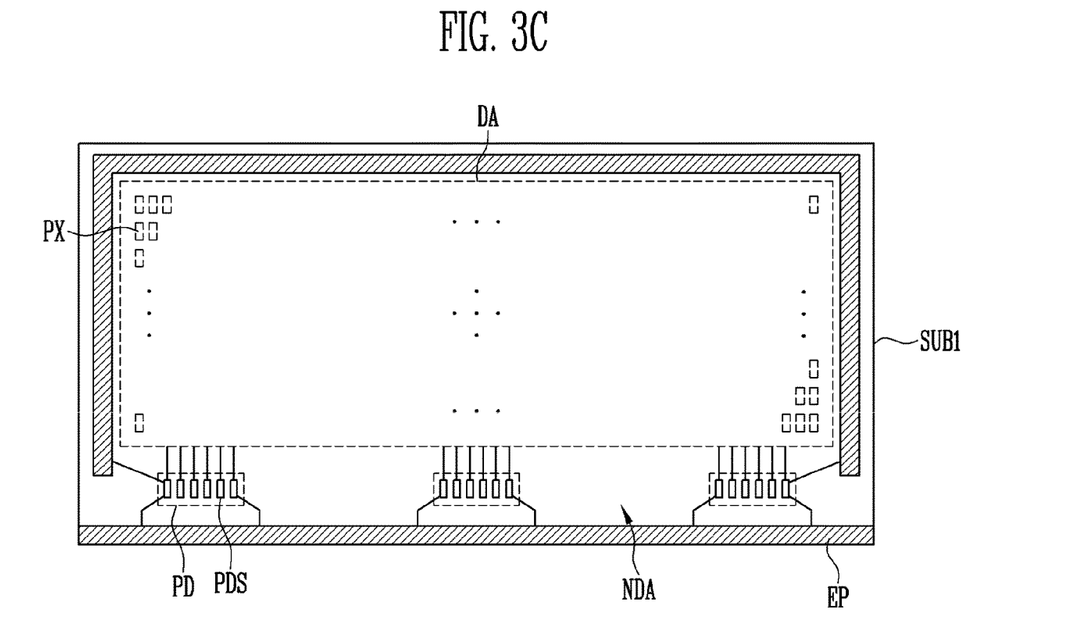

According to another exemplary embodiment, the static electricity absorbing pattern EP may be disposed in a form surrounding the display area DA and the pads PD in a partially opened form, as illustrated in FIG. 3C. The static electricity absorbing pattern EP illustrated in FIG. 3C may absorb static electricity and block an electric influence on the elements like the aforementioned static electricity absorbing patterns EP. Further, the static electricity absorbing pattern EP disposed adjacently to the display area DA and the static electricity absorbing pattern EP disposed adjacently to the pad PD may be formed of the same material or may be formed of different materials.

Figure 3D:
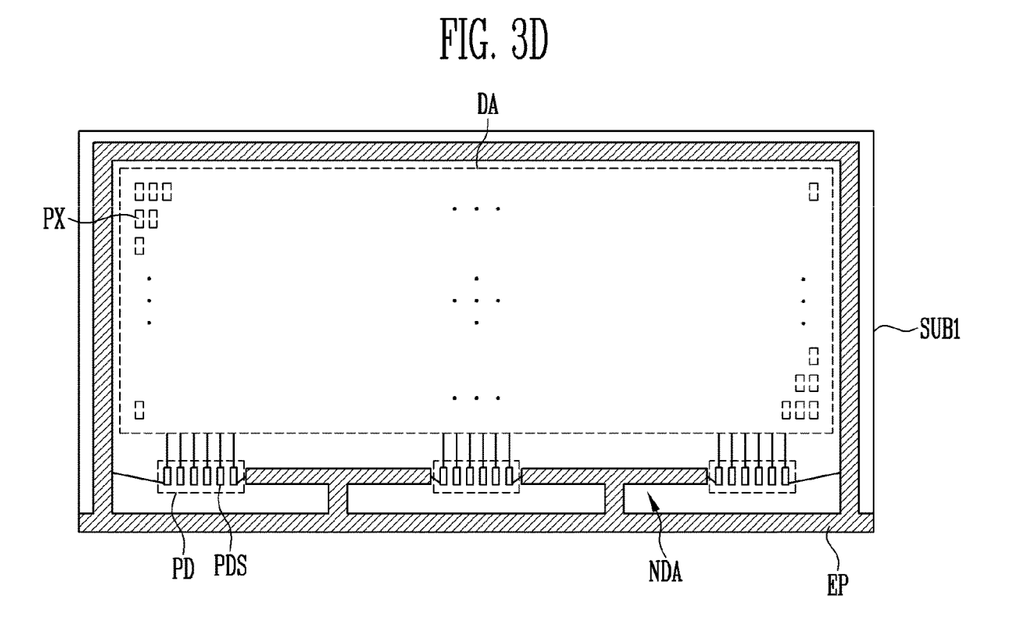

According to another exemplary embodiment, the static electricity absorbing pattern EP may be disposed in a T-shape between the pads PD, as well as disposed in the border area of the first substrate SUB1, as illustrated in FIG. 3D. The static electricity absorbing pattern EP disposed in the T-shape may effectively block static electricity flowing to an area, in which the flexible printed circuit board FPC does not overlap the first substrate SUB1.

The static electricity absorbing pattern EP may be connected to pad electrodes connected with a ground electrode of the printed circuit board PCB through the flexible printed circuit board FPC in order to discharge the absorbed static electricity. That is, the static electricity absorbing pattern EP may be grounded by the ground electrode of the printed circuit board PCB.

According to the exemplary embodiment, the static electricity absorbing pattern EP may be a floating pattern, which is disconnected in a circuit.

As described above, the liquid crystal display device according to the first exemplary embodiment of the present disclosure may easily block static electricity flowing from the outside or generated inside the liquid crystal display device by the static electricity absorbing pattern EP without disposing a device or a separate structure. That is, the liquid crystal display device according to the first exemplary embodiment of the present disclosure may form the static electricity absorbing pattern EP on the first substrate SUB1, thereby protecting the devices, such as the transistor and the lines, from static electricity with low expenses.

Figure 4:
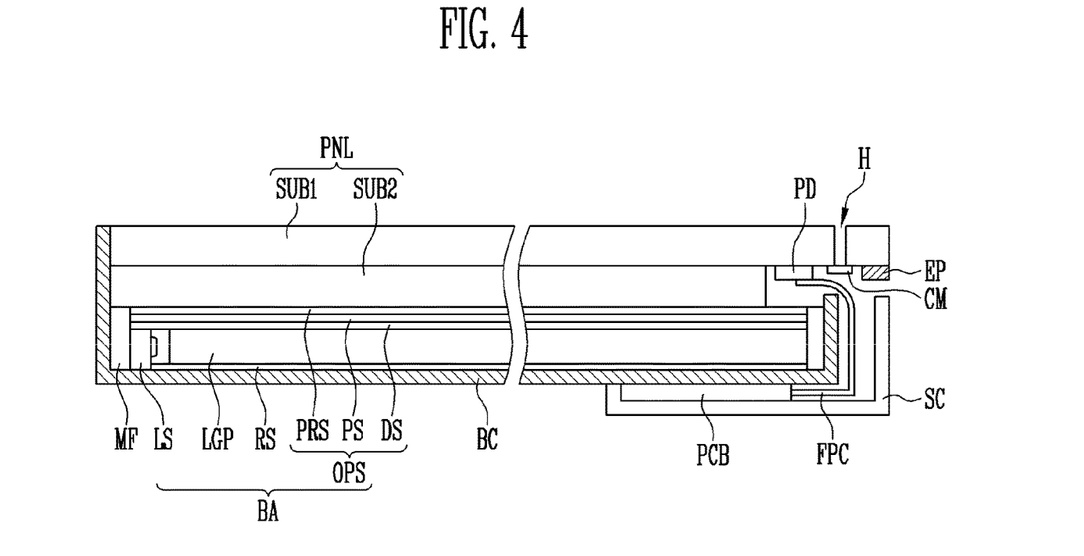
FIG. 4 is a cross-sectional view of a liquid crystal display device according to a second exemplary embodiment of the present disclosure.
Figure 5:
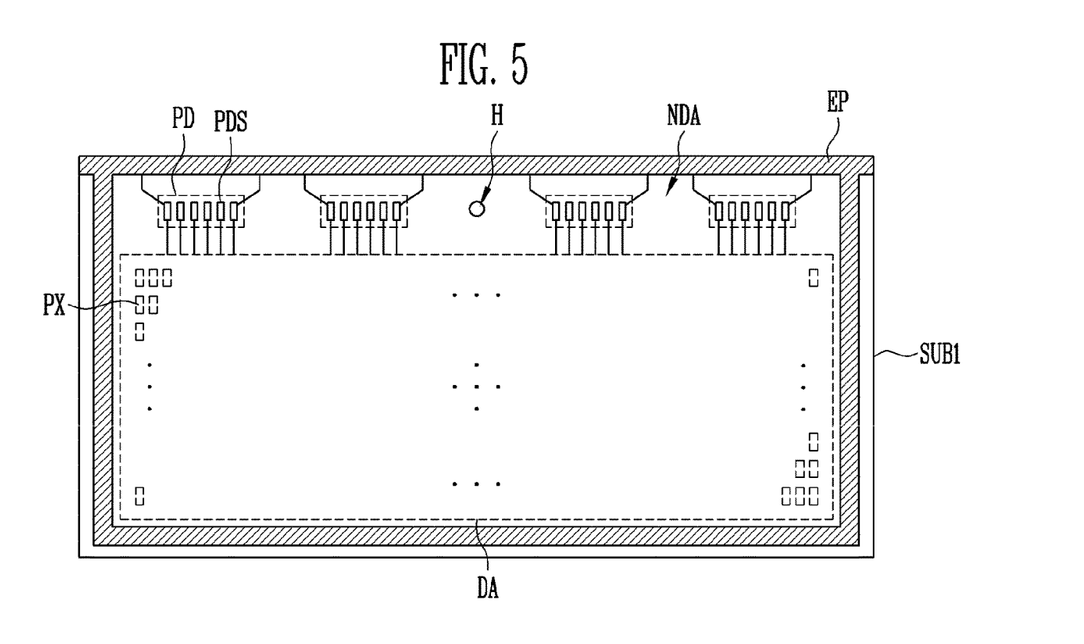
FIG. 5 is a top plan view of a first substrate according to the second exemplary embodiment of the present disclosure.

FIG. 4 is a cross-sectional view of a liquid crystal display device according to a second exemplary embodiment of the present disclosure, and FIG. 5 is a top plan view of a first substrate according to the second exemplary embodiment of the present disclosure.

The liquid crystal display device according to the second exemplary embodiment of the present disclosure illustrated in FIGS. 4 and 5 will be described based on the differences from those of the liquid crystal display device according to the first exemplary embodiment of the present disclosure illustrated in FIGS. 2, 3A, 3B, 3C, and 3D in order to avoid the overlapping description. Parts, which are not specially described with reference to FIG. 4, will follow those of the liquid crystal display device according to the aforementioned exemplary embodiment, and the same reference numeral refers to the same element, and the similar reference numeral refers to the similar element.

Referring to FIG. 4, a substrate SUB1 may include a camera hole H exposing a camera module CM to the outside. The camera hole H may be disposed at one side of the first substrate SUB1, which does not overlap a second substrate SUB2.

The camera module CM may be disposed on one surface of the first substrate SUB1 facing the second substrate SUB2. The camera module CM may photograph a target position on the other surface of the first substrate SUB1 through the camera hole H.

Further, a static electricity absorbing pattern EP absorbing static electricity may be disposed at one side of the first substrate SUB1. For example, static electricity may permeate to a space between the first substrate SUB1 and a shield cover SC from the outside, and may damage a thin film transistor disposed in the camera module CM or a liquid crystal display panel PNL and cause a line defect and the like to a flexible printed circuit board FPC and a driving circuit mounted in a printed circuit board PCB.

Accordingly, the static electricity absorbing pattern EP may be disposed at one side of the first substrate SUB1 and absorb static electricity generated inside the liquid crystal display device or static electricity permeating to the space between the first substrate SUB1 and the shield cover SC to protect the camera module CM and the like.

Further, the static electricity absorbing pattern EP may be connected with a ground electrode of the printed circuit board PCB through pads PD, and may discharge the absorbed static electricity to the ground electrode.

Referring to FIG. 5, the first substrate SUB1 may have a display area DA and a non-display area NDA disposed in a peripheral area of the display area DA, where the peripheral area may be outside the display area DA.

The display area DA is an area in which an image is displayed, and the plurality of pixels PX may be disposed in the display area DA in a matrix form.

The non-display area NDA may be formed at a circumference of the display area DA, but is not limited thereto, and may be formed at only between one to three sides of the display area DA.

The non-display area NDA may include signal lines connected with the pixels PX, the pads PD connecting the signal lines and the flexible printed circuit board FPC, and the static electricity absorbing pattern EP.

The static electricity absorbing pattern EP may be disposed in a border area of the first substrate SUB1 in a form surrounding the display area DA, but is not limited thereto, and may be formed at least one side of the display area DA. Here, the static electricity absorbing pattern EP may be formed of the same material as those of at least some of the signal lines formed on the first substrate SUB1, and may block the static electricity from electrically influencing the pixels PX and the signal lines included inside the display area DA.

Particularly, since the static electricity absorbing pattern EP disposed between the camera hole H and the border area of the first substrate SUB1 does not overlap the second substrate SUB2, the static electricity absorbing pattern EP may absorb static electricity flowing from the outside or generated inside the liquid crystal display device and block an electrical influence on the pad electrodes of the pad PD, the flexible printed circuit board FPC, and the elements mounted in the printed circuit board PCB.

Figure 6:
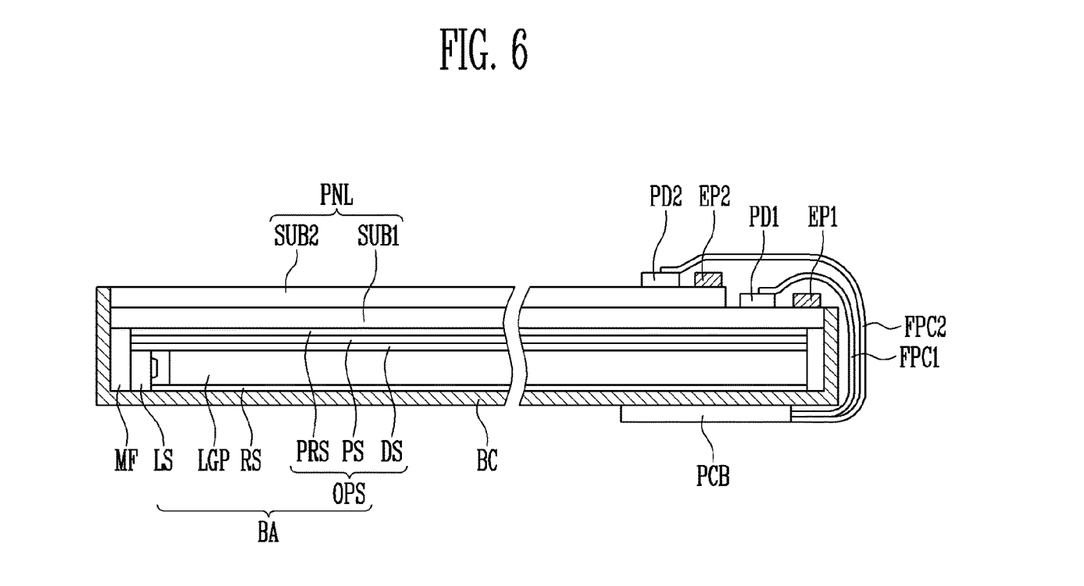
FIG. 6 is a cross-sectional view of a liquid crystal display device according to a third exemplary embodiment of the present disclosure.
Figure 7A:
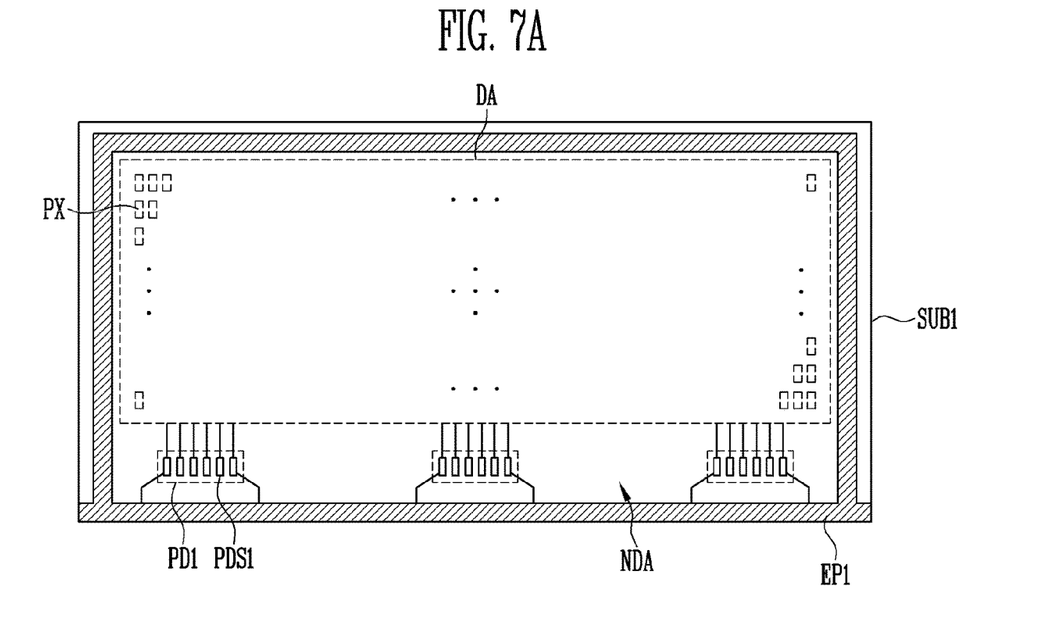
FIG. 7A is a top plan view of a first substrate according to a third exemplary embodiment of the present disclosure.
Figure 7B:
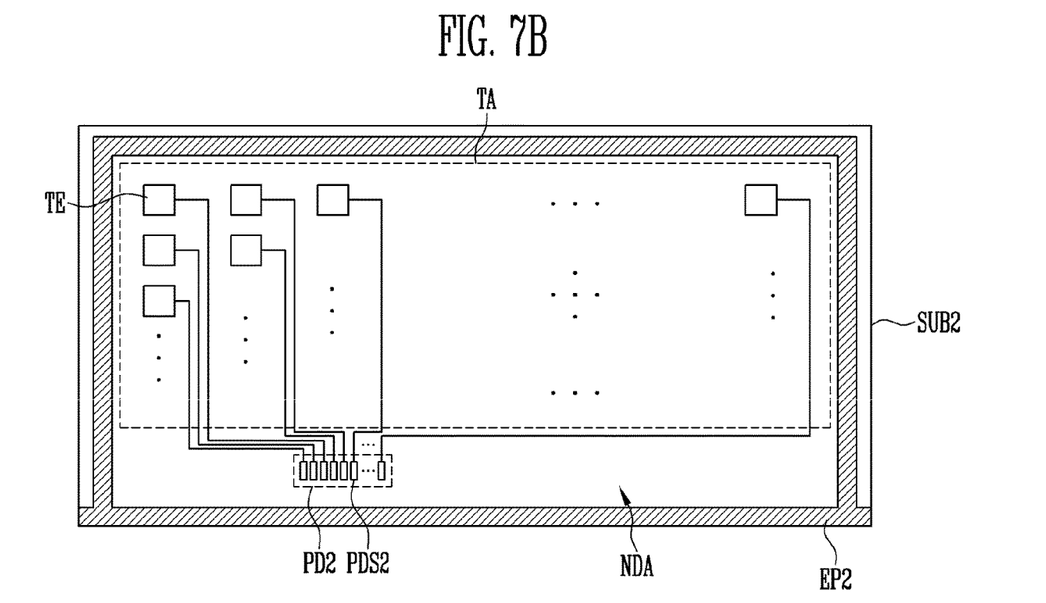
FIG. 7B is a top plan view of a second substrate according to the third exemplary embodiment of the present disclosure.

FIG. 6 is a cross-sectional view of a liquid crystal display device according to a third exemplary embodiment of the present disclosure, FIG. 7A is a top plan view of a first substrate according to a third exemplary embodiment of the present disclosure, and FIG. 7B is a top plan view of a second substrate according to the third exemplary embodiment of the present disclosure.

The liquid crystal display device according to the third exemplary embodiment of the present disclosure illustrated in FIGS. 6, 7A, and 7B will be described based on the differences from those of the liquid crystal display device according to the first exemplary embodiment of the present disclosure illustrated in FIGS. 2, 3A, 3B, 3C, and 3D in order to avoid the overlapping description. Parts, which are not specially described with reference to FIGS. 6, 7A, and 7B, will follow those of the liquid crystal display device according to the aforementioned exemplary embodiment, and the same reference numeral refers to the same element, and the similar reference numeral refers to the similar element.

Referring to FIG. 6, a liquid crystal display panel PNL includes a first substrate SUB1, and a second substrate SUB2 facing the first substrate SUB1.

The first substrate SUB1 may be disposed on a backlight assembly BA, and may include a thin film transistor and a pixel electrode. The thin film transistor and the pixel electrode may be formed on one surface of the first substrate SUB1 facing the second substrate SUB2.

The first substrate SUB1 may have a larger area than that of the second substrate SUB2, and one side of the first substrate SUB1 may not overlap the second substrate SUB2.

The second substrate SUB2 may include a common electrode formed of a transparent conductor, such as an indium tin oxide (ITO) and an indium zinc oxide (IZO). The common electrode may be formed on one surface of the second substrate SUB2 facing the first substrate SUB1. Further, the second substrate SUB2 may include a color filter.

According to the exemplary embodiment, the first substrate SUB1 may include at least one of a color filter and a common electrode, as well as the thin film transistor and the pixel electrode. In this case, the color filter and/or the common electrode may not be present in the second substrate SUB2.

The first substrate SUB1 and the second substrate SUB2 are bonded to each other with a predetermined interval, and a liquid crystal layer LCL is disposed between the first substrate SUB1 and the second substrate SUB2.

A first flexible printed circuit board FPC1 may be connected to first pad PD1 disposed at one side of the first substrate SUB1, and a printed circuit board PCB disposed at a lower side of a bottom chassis BC. Here, the first pads PD1 may be disposed on one surface of the first substrate SUB1 facing the second substrate SUB2.

A second flexible printed circuit board FPC2 may be connected to a second pad PD2 disposed at one side of the first substrate SUB1, and the printed circuit board PCB. Here, the second substrate has one surface facing the first substrate and the other surface facing the one surface, and the second pad PD2 may be disposed on the other surface.

The first and second flexible printed circuit board FPC1 and FPC2 may be disposed to be bent so as to surround a side surface of the bottom chassis BC and a part of a lower surface of the bottom chassis BC.

Further, a first static electricity absorbing pattern EP1 may be disposed at one side of the first substrate SUB1, and a second static electricity absorbing pattern EP2 may be disposed at one side of the second substrate SUB2.

The first static electricity absorbing pattern EP1 may be connected to a ground electrode of the printed circuit board PCB through the first pads PD1, and the second static electricity absorbing pattern EP2 may be connected to the ground electrode of the printed circuit board PCB through the second pad PD2.

Static electricity absorbed by each of the first static electricity absorbing pattern EP1 and the second static electricity absorbing pattern EP2 may be discharged to the ground electrode.

Referring to FIG. 7A, the first substrate SUB1 may have a display area DA and a non-display area NDA disposed in a peripheral area of the display area DA.

The first substrate SUB1 may have a display area DA and a non-display area NDA disposed in a peripheral area of the display area DA. The display area DA is an area in which an image is displayed, and the plurality of pixels PX may be disposed in the display area DA in a matrix form.

The non-display area NDA may include signal lines connected with the pixels PX, the first pad PD1 including first pad electrodes PDS1 connected with the pixels PX through the signal lines, and the first static electricity absorbing pattern EP1 absorbing static electricity.

The first flexible printed circuit board FPC1 may be disposed while overlapping the first pads PD1 and may be connected with the first pad electrodes PDS1.

The static electricity absorbing pattern EP may be disposed in a border area of the first substrate SUB1 in a form surrounding the display area DA, but is not limited thereto, and may be formed at only between one side to three sides of the display area DA. Here, the first static electricity absorbing pattern EP1 may be formed of the same material as those of at least some of the signal lines formed on the first substrate SUB1, and may block the static electricity from electrically influencing the pixels PX and the signal lines included inside the display area DA.

Referring to FIG. 7B, the second substrate SUB2 may include a touch area TA, in which touch electrodes TE are disposed.

FIG. 7B illustrates the touch electrodes TE driven by a self capacitance scheme, but the present disclosure is not limited thereto, and the touch area TA may be driven a mutual capacitance scheme of detecting a change in capacitance by an interaction between a first touch electrode and a second touch electrode.

The touch electrodes TE may detect a touch operation of a user, and may be implemented in various shapes, such as a quadrangular shape, a diamond shape, and a circular shape. The touch electrodes TE may be connected to second pad electrodes PDS2 of the second pad PD2 through touch lines.

When the touch electrodes TS receive interference from the outside, the touch electrodes TS cannot precisely detect the touch operation of the user, so that it is necessary to protect the touch electrodes TS from the interference from the outside.

Accordingly, the static electricity absorbing pattern EP2 may be disposed in a border area of the second substrate SUB2 in a shape surrounding the touch area TA to protect the touch electrodes TE the interference from the outside.

Particularly, the static electricity absorbing pattern EP2 disposed between the second pad PD2 and the border area of the second substrate SUB2 may absorb static electricity flowing from the outside or generated inside the liquid crystal display device, thereby effectively blocking electric influence on the touch electrodes and the touch lines.

The present disclosure has been described with reference to the exemplary embodiment illustrated in the drawing, but the exemplary embodiment is only illustrative, and it would be appreciated by those skilled in the art that various modifications and equivalent exemplary embodiments may be made. Accordingly, the actual scope of the present disclosure must be determined by the spirit of the appended claims.

What is claimed is:

1. A display device, comprising:
a substrate including a display area displaying an image and a non-display area disposed in a peripheral area surrounding the display area;
a static electricity absorbing pattern disposed on the non-display area;
a pad disposed inside the static electricity absorbing pattern;
a printed circuit board disposed on the substrate;
a first flexible printed circuit board having one end connected to the first pad through pad electrodes and an other end connected to the printed circuit board; and
a shield cover disposed on the first substrate and substantially covering the printed circuit board and the first flexible printed circuit board,
wherein the shield cover is positioned inside a virtual line extended in a vertical direction from a border of the first substrate, and the vertical direction is perpendicular to a surface of the first substrate facing the second substrate,
wherein the static electricity absorbing pattern is disposed in a border area of the substrate surrounding the display area and the pad,
wherein the first flexible printed circuit board is bent inside the static electricity absorbing pattern and shielded by the shield cover outside, and
wherein the static electricity absorbing pattern is disposed in a space not overlapping the second substrate and disposed between the first substrate and the shield cover that corresponds to a boundary of the first substrate, or the static electricity absorbing pattern overlaps both the first flexible printed circuit board and a second flexible printed circuit board overlapping the first flexible printed circuit board.

2. A liquid crystal display device, comprising:
a first substrate including a display area displaying an image, and a non-display area disposed in a form surrounding the display area;
a second substrate disposed on the first substrate;
a liquid crystal layer disposed between the first substrate and the second substrate;
a first static electricity absorbing pattern disposed on the non-display area of the first substrate;
first pads disposed on the non-display area of the first substrate;
a printed circuit board disposed on the second substrate;
a flexible circuit board having one end connected to the first pad through pad electrodes and an other end connected to the printed circuit board; and
a shield cover disposed on the first substrate and substantially covering the printed circuit board and the flexible circuit board,
wherein the shield cover is positioned inside a virtual line extended in a vertical direction from a border of the first substrate, and the vertical direction is perpendicular to a surface of the first substrate facing the second substrate, wherein the first static electricity absorbing pattern is disposed in a border area of the first substrate surrounding the display area and the first pads, and wherein the first static electricity absorbing pattern is disposed in a space not overlapping the second substrate and disposed between the first substrate and the shield cover that corresponds to a boundary of the first substrate, or the first static electricity absorbing pattern overlaps both the first flexible printed circuit board and a second flexible printed circuit board overlapping the first flexible printed circuit board.

3. The liquid crystal display device of claim 2, wherein at least a part of the first static electricity absorbing pattern which is disposed on the first substrate does not overlap the second substrate.

4. The liquid crystal display device of claim 2, wherein the first static electricity absorbing pattern is disposed on one surface of the first substrate, the one surface of the first substrate facing the second substrate.

5. The liquid crystal display device of claim 2, wherein the first static electricity absorbing pattern is connected with some of the pad electrodes and is grounded.

6. The liquid crystal display device of claim 2, wherein a part of the first static electricity absorbing pattern is disposed between the first pads.

7. The liquid crystal display device of claim 2, wherein the first substrate has a larger area than an area of the second substrate.

8. The liquid crystal display device of claim 2, wherein the first flexible printed circuit board is entirely disposed in an area overlapping the first substrate but not overlapping the second substrate, or overlaps the second flexible printed circuit board.

9. The liquid crystal display device of claim 2, wherein the shield cover dose not contact the static electricity absorbing pattern and the first substrate.

10. The liquid crystal display device of claim 2, wherein the shield cover has a horizontal portion, which is substantially parallel to the surface of the first substrate, and a vertical portion, which is extended from one end of the horizontal portion in the vertical direction, and wherein the static electricity absorbing pattern is disposed between the first substrate and the vertical portion of the shield cover, and absorbs static electricity permeating to a space between the first substrate and the shield cover.

11. The liquid crystal display device of claim 2, further comprising, a bottom chassis disposed between the second substrate and the printed circuit board; and a backlight assembly accommodated in the bottom chassis, the backlight assembly providing light to the second substrate, wherein the flexible printed circuit board is bent so as to surround a side surface of the bottom chassis and a part of a lower surface of the bottom chassis.

12. The liquid crystal display device of claim 2, further comprising:

a camera hole, which exposes a camera module to the outside.

13. The liquid crystal display device of claim 12, wherein the camera hole is disposed in the non-display area.

14. The liquid crystal display device of claim 12, wherein a part of the first static electricity absorbing pattern is disposed between the camera hole and a border area of the first substrate.

15. The liquid crystal display device of claim 2, wherein the second substrate includes a touch area, in which touch electrodes detecting a touch are disposed.

16. The liquid crystal display device of claim 15, further comprising:

a second static electricity absorbing pattern disposed in an area other than the touch area.

17. The liquid crystal display device of claim 16, wherein the second static electricity absorbing pattern is disposed in a form surrounding the touch area.

18. The liquid crystal display device of claim 16, wherein the second substrate has one surface facing the first substrate, and an other surface opposite to the one surface, and the second static electricity absorbing pattern is disposed on the other surface.

19. The liquid crystal display device of claim 16, further comprising:

a second pad which is disposed in an area other than the touch area, and is connected to a second flexible printed circuit board through pad electrodes.

20. The liquid crystal display device of claim 19, wherein at least a part of the second static electricity absorbing pattern is disposed between the second pad and a border area of the second substrate.

21. A liquid crystal display device, comprising:

a first substrate including a display area displaying an image, and a non-display area disposed in a peripheral area surrounding the display area;

a second substrate disposed on the first substrate;

a liquid crystal layer disposed between the first substrate and the second substrate;

a static electricity absorbing pattern disposed on the non-display area;

a pad disposed inside the static electricity absorbing pattern and connected to a first flexible printed circuit board;

a printed circuit board disposed on the second substrate;

a flexible circuit board having one end connected to the pad and an other end connected to the printed circuit board; and a shield cover disposed on the first substrate and substantially covering the printed circuit board and the flexible circuit board, wherein the static electricity absorbing pattern is disposed in a border area of the first substrate surrounding the display area and the pad, wherein the first flexible printed circuit board is bent inside the static electricity absorbing pattern and shielded by cover material the shield cover outside, wherein the shield cover is positioned inside a virtual line extended in a vertical direction from a border of the first substrate, and the vertical direction is perpendicular to a surface of the first substrate facing the second substrate, and wherein the static electricity absorbing pattern is disposed in a space not overlapping the second substrate and disposed between the first substrate and the shield cover that corresponds to a boundary of the first substrate, or the static electricity absorbing pattern overlaps both the first flexible printed circuit board and a second flexible printed circuit board overlapping the first flexible printed circuit board.

* * * * *